United States Patent [19]
Tidwell

[11] Patent Number: 5,963,969
[45] Date of Patent: Oct. 5, 1999

[54] DOCUMENT ABSTRACTION SYSTEM AND METHOD THEREOF

[75] Inventor: William A. Tidwell, 9327 Pentland Pl., Fairfax, Va. 22031

[73] Assignee: William A. Tidwell, Fairfax, Va.

[21] Appl. No.: 08/848,406

[22] Filed: May 8, 1997

[51] Int. Cl.⁶ .................................................. G06F 17/21
[52] U.S. Cl. .......................... 707/531; 707/500; 707/501
[58] Field of Search .................................... 707/531, 501, 707/1, 536, 532, 515, 514, 5, 500; 704/4

[56] References Cited

U.S. PATENT DOCUMENTS

| | | | |
|---|---|---|---|
| 5,050,071 | 9/1991 | Harris et al. .................................. | 707/1 |
| 5,077,688 | 12/1991 | Doi et al. .................................. | 707/531 |
| 5,241,671 | 8/1993 | Reed et al. .................................. | 707/532 |
| 5,257,186 | 10/1993 | Ukita et al. .................................. | 707/531 |
| 5,297,027 | 3/1994 | Morimoto et al. ....................... | 707/501 |
| 5,297,249 | 3/1994 | Bernstein et al. ....................... | 707/501 |
| 5,384,703 | 1/1995 | Withgott et al. ......................... | 707/531 |
| 5,642,502 | 6/1997 | Driscoll et al. ............................. | 707/5 |
| 5,642,520 | 6/1997 | Takeshita et al. ....................... | 707/531 |
| 5,696,962 | 12/1997 | Kupiec ........................................ | 707/5 |
| 5,708,825 | 1/1998 | Sotomayor .............................. | 707/501 |
| 5,778,397 | 7/1998 | Kupiec et al. ........................... | 707/500 |
| 5,819,265 | 10/1998 | Ravin et al. ............................. | 707/536 |

OTHER PUBLICATIONS

"A Handbook for Using Nexis." (Dayton: Mead Data Central, Jan. 1, 1994) pp. 12, 15, 20, 25, 26, 37 & 64.

*Primary Examiner*—Joseph H. Feild
*Assistant Examiner*—John L. Young
*Attorney, Agent, or Firm*—McDermott, Will & Emery

[57] ABSTRACT

A document abstract system and methodology produces an abstract from a text by identifying sentences within the text that contain numerical information, such as dates and numbers. The sentences with numerical information along with the first and last sentences of the document are copied for producing the abstract. The computer generated abstract preferably includes a list of proper nouns and adjectives and most common words in the document.

24 Claims, 6 Drawing Sheets

DOCUMENT ABSTRACTION SYSTEM AND METHOD THEREOF

TECHNICAL FIELD

The present invention relates to information processing systems and more particularly to producing an abstract of a document.

BACKGROUND ART

An abstract is a brief passage that summarizes the important points of a text. Conventionally, abstracts are manually produced from an article, book, or document. A person, perhaps even the writer, reads through the document to attain an understanding of the contents. With that understanding, the person composes an abstract that summarizes the document. This process is often very time-consuming.

In addition, manually producing an abstract can be quite expensive. A person writing an abstract for a technical document must be able to understand the contents, which requires advanced education. Thus, sufficiently educated people are in much demand and often highly paid.

An increasing number of documents are now being converted into computer readable form and stored in computer databases and file systems. As these computer databases include more and more documents, they are becoming increasingly more difficult to manage and use. No single individual can read and be familiar with the nature and contents of every document in one of these databases. Browsing these databases for a relevant document can be quite time-consuming.

Some document management systems provide a keyword search facility, allowing a user to search for documents containing particular words or phrases. However, with very large document databases, it is not uncommon for the search engine of the document management system to return hundreds of documents matching the search criteria. Thus, even with a search facility, users still have to browse for relevant documents.

Accordingly, it is desirable to maintain abstracts for each document to reduce browsing times. However, given the large number of documents it is cost prohibitive to manually produce abstracts for each document in a document database. Therefore, there is a need for producing abstracts without much manual intervention.

DISCLOSURE OF THE INVENTION

One aspect of the invention is a method of producing an abstract for a document, which has one or more sentences each having one or more words. The method includes the steps of determining the first sentence in the text and determining the last sentence in the text. The method also includes the step determining, from among the remaining sentences of the text, one or more abstract sentences containing numeric information. The first sentence, the one or more abstract sentences, and the last sentence are used to produce the abstract.

One embodiment further comprises steps for determining proper names within the text and producing the abstract based on the proper names. Another embodiment further comprises steps for determining common words in the text and producing the abstract based on the number of occurrences of the common words.

In another embodiment, the method comprises steps for searching for predetermined keywords within the text. If one of the predetermined keywords is found, then a sentence which contains that keyword is established as a keyword abstract sentence. The abstract is produced from the first, last, abstract, and keyword abstract sentences.

Another aspect is a method of searching texts, which includes the step of producing abstracts for each text. The method also includes the steps of receiving a search key from a user and searching the abstracts for an abstract that matches the search key. The method additionally comprises the step of outputting the abstract that matches the search key.

According to another aspect, a method of searching texts includes the steps of receiving a search key from a user and searching the texts for a text that matches the search key. The method also has the steps of generating an abstract from the document and outputting the abstract.

In accordance with another aspect, a document abstraction system for producing an abstract from a text comprises means for determining the first sentence of the text and means for determining the last sentence of the text. The system also has means for determining, from among the remaining sentences of the text, one or more abstract sentences from the text, in which an abstract sentence contains numeric information. The system additionally comprises means for producing the abstract based on the first, last, and abstract sentences.

In accordance with yet another aspect, a computer-readable medium stores sequences of the instructions for producing an abstract from a text. More specifically, the computer-readable medium has instructions for performing the steps of determining the first sentence in the text and determining the last sentence in the text. The medium also includes instructions for the step of determining, from among the remaining sentences of the text, one or more abstract sentences containing numeric information. In addition, the medium has instructions for producing the abstract based on the first sentence, the one or more abstract sentences, and the last sentence.

The method and apparatus of the invention thus produce, with reduced manual intervention, an abstract of a text by listing the first and last sentences and sentences that contain numeric information.

Additional advantages and novel features of the invention will be set forth in part in the description which follows, and in part will become apparent upon examination of the following or may be learned by practice of the invention. The advantages of the invention may be realized and attained by means of the instrumentalities and combinations particularly pointed out in the appended claims.

BRIEF DESCRIPTION OF DRAWINGS

The present invention is illustrated by way of example, and not by way of limitation, in the figures of the accompanying drawings and in which like reference numerals refer to similar elements and in which.

BEST MODE FOR CARRYING OUT THE INVENTION

A method and apparatus for producing an abstract of a document are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
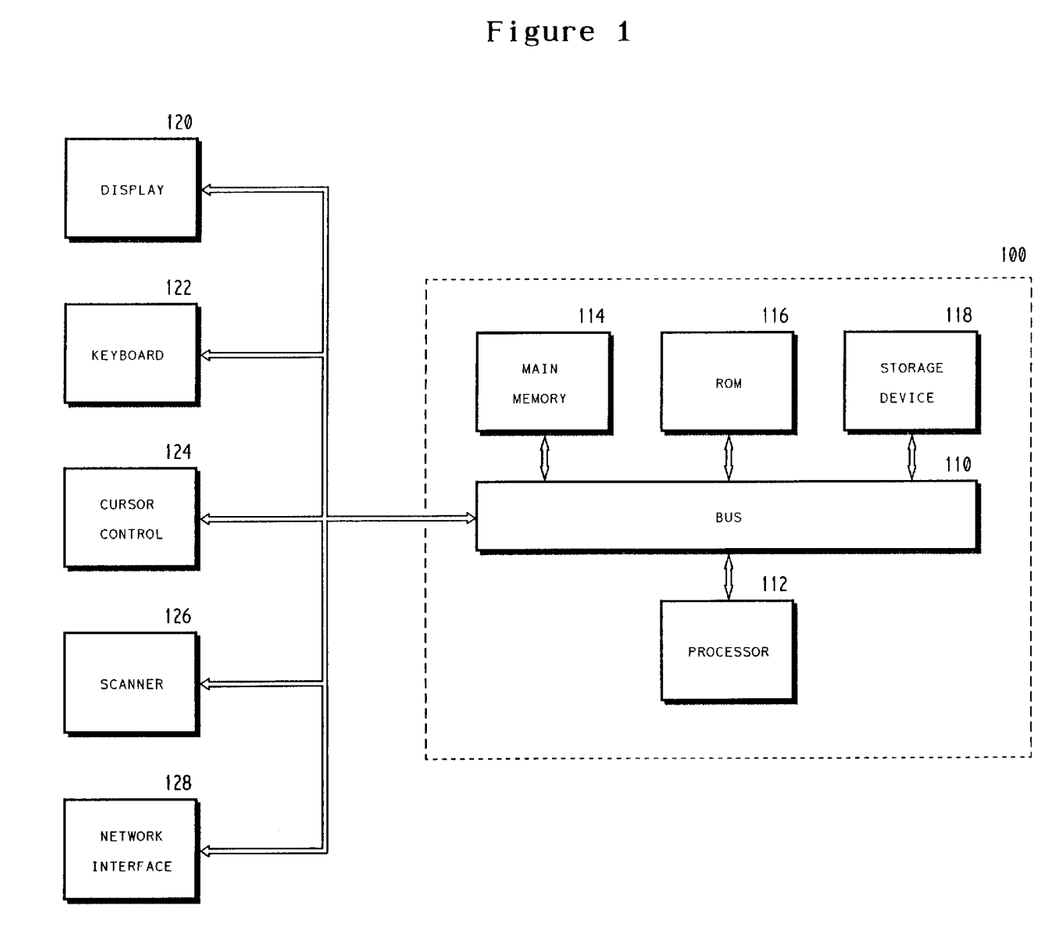
FIG. 1 is a block diagram of a computer system that may be used to implement the present invention.

Referring to FIG. 1, depicted is a block diagram of a computer system 100 upon which an embodiment of the present invention can be implemented. Computer system 100 includes a bus 110 or other communication mechanism for communicating information, and a processor 112 coupled with bus 110 for processing information. Computer system 100 further comprises a random access memory (RAM) or other dynamic storage device 114 (referred to as main memory), coupled to bus 110 for storing information and instructions to be executed by processor 112. Main memory 114 also may be used for storing temporary variables or other intermediate information during execution of instructions by processor 112. Computer system 100 also comprises a read only memory (ROM) and/or other static storage device 116 coupled to bus 110 for storing static information and instructions for processor 112. A data storage device 118, such as a magnetic disk or optical disk and its corresponding disk drive, can be coupled to bus 110 for storing information and instructions.

Input and output devices can also be coupled to computer system 100 via bus 110. For example, computer system 100 uses a display device 122, such as a cathode ray tube (CRT), for displaying information to a computer user. Computer system 100 further uses a keyboard 124 and a cursor control 126, such as a mouse. In addition, computer system 100 may employ a scanner 126 for converting paper documents into a computer readable format. Furthermore, computer system 100 can use a network interface 128, such as a modem, for accessing information on other computer systems in a local area network (LAN) or on the Internet, including the World Wide Web.

The present invention is related to the use of computer system 100 to produce an abstract of a document. According to one embodiment, producing an abstract of a document is performed by computer system 100 in response to processor 112 executing sequences of instructions contained in memory 114. Such instructions may be read into memory 114 from another computer-readable medium, such as data storage device 118. Execution of the sequences of instructions contained in memory 114 causes processor 112 to perform the process steps that will be described hereafter. Alternatively, hard-wired circuitry may be used in place of or in combination with software instructions to implement the present invention. Thus, the present invention is not limited to any specific combination of hardware circuitry and software.

ABSTRACTING A TEXT

Figure 2:
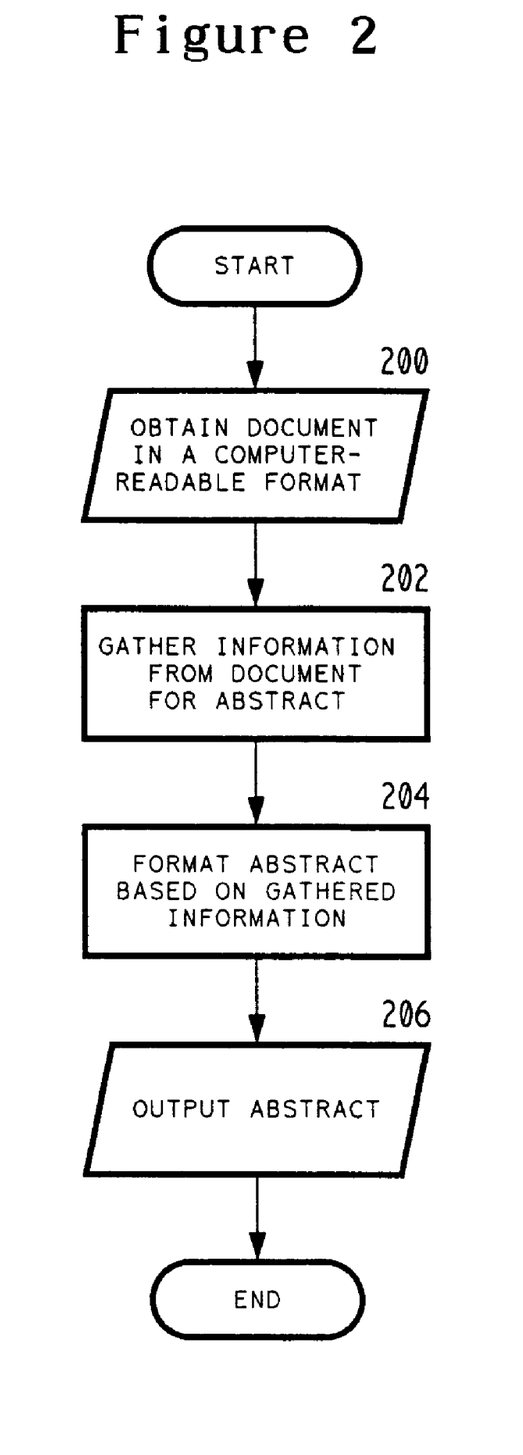
FIG. 2 is a flowchart illustrating the high-level operation of abstracting a document according to an embodiment of the present invention.

The process of abstracting a text according to an embodiment of the present invention is shown in FIG. 2. At step 200, a text is obtained in a computer-readable format. For purposes of explanation, the text is referred to as a document; however, as contemplated, any text, such as an article, chapter, or sequence of related sentences, may be abstracted.

The particular computer-readable format of the text will vary from implementation to implementation, but the present invention is not limited to any specific format. A wide variety of computer-readable formats and means for converting documents into those formats are well-known in the art. One example operates on an ASCII text representation of a document, stored by a word processing program. Another example operates on a computer-readable document that is based on a scanned, "hard copy" paper document.

In addition to obtaining a document in computer-readable format, the system also records reference information about the computer-readable document. For example, the system according to one embodiment records an electronic address for the document. This electronic address can be the local filename for the document, the full path name of the document, or a fully qualified Uniform Resource Locator (URL) address of the document on the World Wide Web. In another embodiment, the system records additional reference information about the document, such as the author, the title, and the date of the document, by techniques well-known in the art.

After obtaining the document in a computer-readable format (step 200), the system gathers information for the abstract (step 202). As more fully described hereafter, the system copies the first and last sentences of the document, and those sentences in between that contain numeric information (dates and numbers). In addition, the number of occurrences of each word is counted. In step 204, the gathered information is processed and formatted into a full abstract, also more fully described hereafter.

Finally, in step 206, the system outputs the abstract for later use. For example, one embodiment of the invention displays the abstract on display 120. Another embodiment saves the abstract in storage device 118, and yet another embodiment transmits the document to another computer system through network interface 128.

An important principle of the present invention recognizes that authors often illustrate their points with specific examples involving dates or numbers. Accordingly, these crucial portions of the document are identified by searching for numeric information within the document. By copying whole sentences with numeric information for the abstract, the author's language at these crucial points in the document is captured. In this manner, highly relevant abstracts are produced while at the same time greatly reducing the amount of manual intervention and computing resources. While most documents can be profitably abstracted according to the present invention, the abstracts produced for historical and news articles have been found to be particularly useful.

GATHERING INFORMATION FOR THE ABSTRACT

Figure 3:
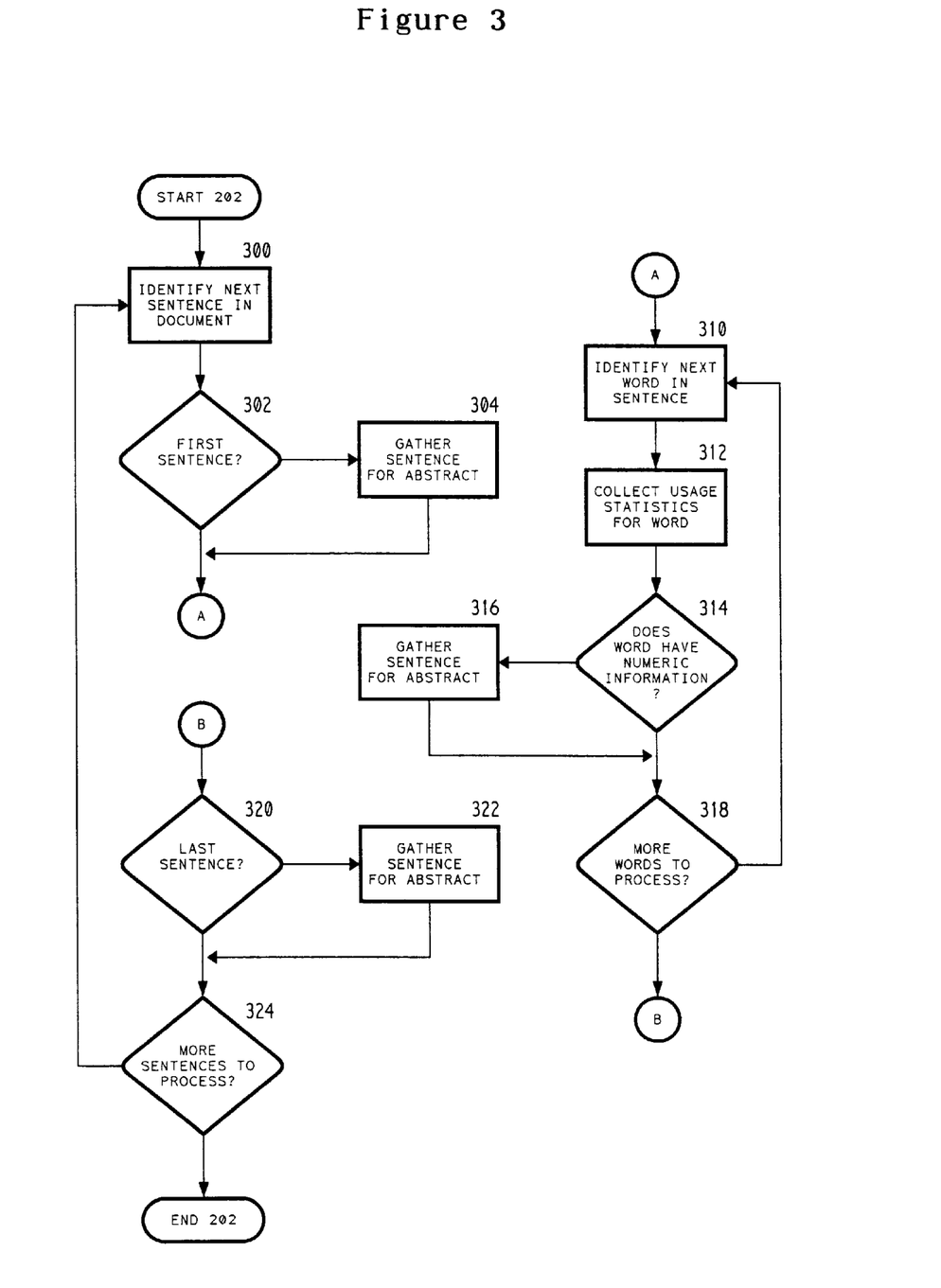
FIG. 3 is a flowchart illustrating the process of gathering information from a document for an abstract according to an embodiment of the present invention.

According to one embodiment of the invention, the operation of step 202, gathering information from the document for the abstract, is shown in FIG. 3. In particular, a nested loop structure is employed. The outer loop, controlled by steps 300 and 324, comprises steps that examine each sentence of the document in turn. The inner loop, controlled by steps 310 and 318, comprises steps examining each word of a sentence in turn.

At step 300, the beginning of the other loop, the system identifies successive sentences to examine. There are a variety of techniques for identifying a sentence in a document known in the art, but the present invention is not limited to any particular method of identifying a sentence. According to a preferred embodiment, sentences are identified as text of the document located between two periods.

If the sentence being examined is the first sentence of the document (step 302), then that sentence is copied for the abstract (step 304). in either case, execution proceeds to the inner loop at step 310.

The inner loop, at step 310, successively identifies words within each sentence. There are a variety of techniques for identifying a word in a sentence known in the art, but the present invention is not limited to any particular method of identifying a word. According to a preferred embodiment, words are identified as alphanumeric characters located between two spaces of a sentence.

After a word is identified, the system collects usage statistics about that word (step 312). In one embodiment, the number of occurrences of each word is counted. According to another embodiment, a word is identified as a proper name (noun or adjective), if the word, not at the beginning of a sentence, starts with a capital letter. When a word is identified as a proper name, that information is recorded for later use. Preferably, both these statistics are kept.

In step 314, the word under consideration is inspected to see if it contains numeric information, that is, dates and numbers. Accordingly, one embodiment of the invention looks for numeric information by searching for numerals (the digits 0–9). Another embodiment also looks for spelled out numbers in English (e.g., "one" and "ten"), spelled out months (e.g., "November"), and spelled out days of the week (e.g, "Monday"). Other embodiments look for spelled out numbers in other foreign languages, for example, French "un" and "dix." If the word under consideration does contain numeric information, then the sentence containing that word is copied for the abstract (step 316).

In another embodiment, the system in step 314 additionally searches for predetermined keywords, preferably selected at the option of the user. The particular set of the predetermined keywords that is used depends on the nature of the specialized subject matter of the text. For example, if the text is an article of electoral history, then the set of predetermined keywords includes words such as "elect," "nominate," "campaign," and "vote."

After a word is inspected for collecting usage statistics and identifying numeric or keyword information, the system checks to see if there are more words in the sentence to consider (step 318). If there is at least one more word to consider, then execution proceeds back to step 310, where the next word in the sentence is identified. On the other hand, if there are no more words left in the sentence, then execution returns to the outer loop at step 320.

At step 320, if the sentence being examined is the last sentence of the document, then that sentence is copied for the abstract (step 322). In either case, the system checks to see if there are more sentences in the document to consider (step 324). If there is at least one more sentence to consider, then execution proceeds back to step 300, where the next sentence in the document is identified. On the other hand, if there are no more sentences left in the document to process, then the execution of step 202, gathering information for the abstract, is complete.

FORMATTING AN ABSTRACT

Figure 4:
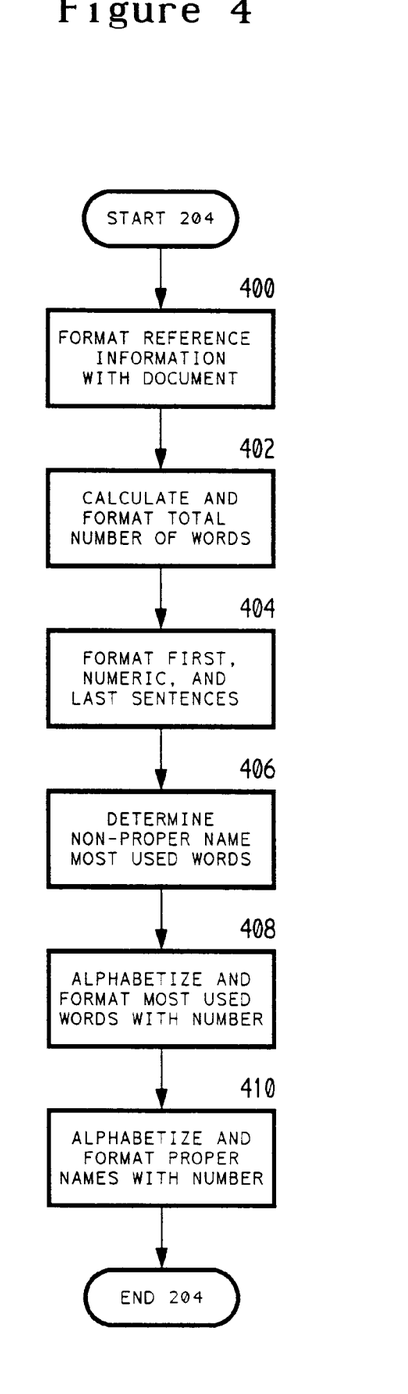
FIG. 4 is a flowchart illustrating the process of formatting gathered information to an abstract according to an embodiment of the present invention.

In a preferred embodiment, step 204, formatting the information gathered for the abstract in step 202, comprises the steps depicted in FIG. 4.

In step 400, the reference information associated with the document is formatted. The reference information comprises what was obtained at step 200 and may include the electronic address, title, author, and date of the document. In addition, the date that the abstract was generated may be included. TABLE 1 shows formatted reference information on a sample document, an article on Civil War history, written by the inventor.

TABLE 1

| |
| --- |
| Title John Wilkes Booth and John Yates Beall |
| Author William A. Tidwell |
| Date of Publication 26 January 1997 |
| Date of Abstract 4 March 1997 |

After formatting the reference information, the number of total words is calculated from the word usage statistics and formatted (step 402). TABLE 2 shows result of step 402, for the same sample document.

TABLE 2

| |
| --- |
| Total Words 1042 |

In step 404, the first, numeric, and last sentences that were copied in step 202 are formatted for the abstract. Specifically, the first sentence is printed first, then the sentences containing numeric information, and finally the last sentence. According to one embodiment, all sentences containing numeric information are output. For the sample document, this embodiment copies about fifteen sentences of the document for the abstract.

In another embodiment, the number of these internal sentences is limited to a prescribed number, such as ten. For purposes of illustration and brevity, TABLE 3 shows formatted output of an embodiment using a limit of two internal sentences with numeric information.

TABLE 3

| Abstract |
| --- |
| John Yates Beall (pronounced "bell") was a Virginia Hero. In late 1864 he was captured by the Union and convicted of espionage. He was hanged on 24 February 1865. However, the fact that Booth and Beall met in Charles Town in 1859, does not prove that Booth shot Lincoln out of revenge. |

In step 406, a list of the most common words in the document is generated according to the number of occurrences of each word, collected in step 312. This list is pruned by removing proper names from the list and removing non-content words. Non-content words include pronouns (e.g., "he," "she," and "it"), conjunctions (e.g., "and," "but," and "or"), articles (e.g., "the," "a," and "an"), and prepositions (e.g., "in," "of," and "to"). In step 408, a prescribed number, preferably ten, of the most common words from the pruned list is alphabetized and formatted. In one embodiment, each word is formatted with the number of occurrences. In step 410, a list of proper names is generated, alphabetized, and formatted.

FACILITATING DOCUMENT SEARCHES

Another aspect of the invention relates to facilitating searches of documents within a large database or catalog of documents.

Figure 5:
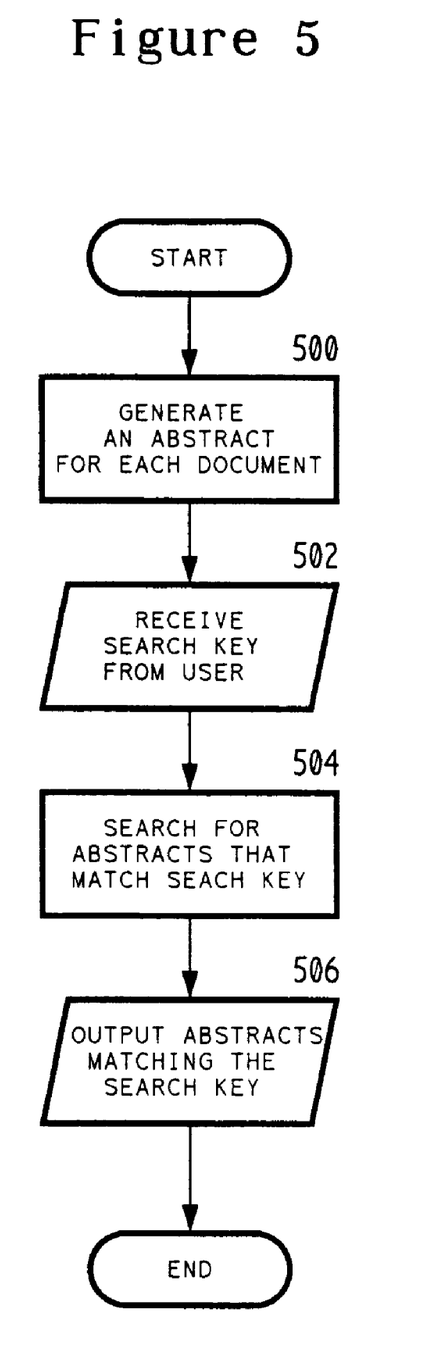
FIG. 5 is a flowchart illustrating the operation of searching a plurality of documents according to an aspect of the invention.

Referring to FIG. 5, an abstract is generated for each document being maintained by the database or the catalog (step 500). Each abstract is produced by the methods described above and includes reference information, the first and last sentences of the document, and sentences containing numeric information. In one embodiment, the abstract produce comprises a list of the proper names in the document. In another embodiment, the produced abstract contains a list of the most common words.

In step 502, a search key is retrieved from a user, and the generated abstracts are searched based on the search key (step 504). A variety of search techniques are known in the art, but the present invention is not limited to any particular search technique. In fact, the particular search technique may vary from implementation to implementation. One example employs a keyword search based on a text string input by the user. Another example implements conditional searches with Boolean operators.

In step 506, abstracts that match the search key are output to the user, completing the search request. Since abstracts are generally much smaller than their corresponding documents, searching the abstracts consumes fewer computing resources than a full-text search of all the documents. Another advantage of this aspect of the invention is that only the abstract needs to be on-line, allowing the documents to be stored off-line, reducing storage costs. A particular benefit enables document providers to control and charge for access to the full-text of their documents, while allowing potential customer to browse and search their inventory through the abstracts.

Figure 6:
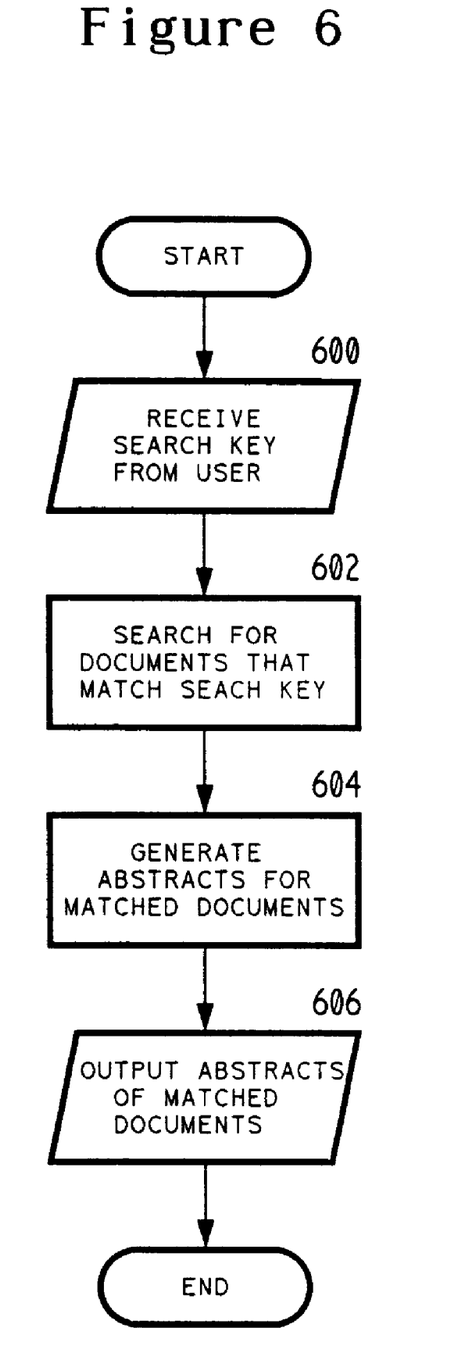
FIG. 6 is a flowchart illustrating the operation of searching a plurality of documents according to another aspect of the invention.

Another aspect of the invention, the operation of which is illustrated in FIG. 6, is found to be particularly beneficial for World Wide Web searches. Starting at step 600, a search key is received from the user, and documents are searched to match that search key (step 602).

Instead of merely displaying the electronic address or title of the matched document, as many World Wide Web search engines do, an abstract is generated for each matched document (step 604) and output to the user (step 606). By showing an abstract to the user, the user can determine whether the matched document is relevant before downloading the entire document.

In the foregoing specification, the invention has been described with reference to specific embodiments thereof. It will, however, be evident that various modifications and changes may be made thereto without departing from the spirit and scope of the invention. The specification and drawings are, accordingly, to be regarded in an illustrative rather than a restrictive sense.

What is claimed is:

1. A method of producing an abstract for a text, said text comprising one or more sentences, each sentence comprising one or more words, said method comprising the computer-implemented steps of:

determining the first sentence of said text;

determining the last sentence of said text;

determining, among the remaining sentences of said text, at most ten abstract sentences containing numeric information; and producing said abstract based on said first sentence, said at most ten abstract sentences, and said last sentence.

2. The method of claim 1, wherein the step of determining one or more abstract sentences containing numeric information, includes the steps of:

searching for said numeric information within said text; and if said numeric information is found, establishing a sentence containing said numeric information as an abstract sentence.

3. The method of claim 2, wherein the step of searching for said numeric information within said text includes the step of searching for numerals within said text.

4. The method of claim 2, wherein the step of searching for said numeric information within said tex includes the step of searching for spelled out numbers within said text.

5. The method of claim 2, wherein the step of searching for said numeric information within said text includes the step of searching for spelled out months within said text.

6. The method of claim 2, wherein the step of searching for said numeric information within said text includes the step of searching for spelled out days of the week within said text.

7. The method of claim 1, further comprising the steps of:

determining one or more proper names in said text, wherein a proper name is a word whose initial letter is capitalized when not at the beginning of a sentence of said one or more sentences; and producing said abstract based on said one or more proper names.

8. The method of claim 7, further comprising the steps of:

counting a number of occurrences for each proper name of said one or more proper names; and when producing said abstract based on said proper name, producing said abstract based on the number of occurrences for said proper name.

9. The method of claim 1, further comprising the steps of:

counting a number of occurrences for each word within said text;

generating a list of words from said text and the number of occurrences thereof;

pruning said list of words to produce a pruned list of words;

determining a plurality of common words from said pruned list of words, said plurality of common words comprising words from said pruned list of words having at least as many occurrences as any words from said pruned list of words not part of said plurality of common words; and producing said abstract based on said plurality of common words.

10. The method of claim 9, wherein the step of pruning said list of words to produce a pruned list of words includes the step of removing a plurality of non-content words from said list of words, wherein said plurality of non-content words comprises pronouns, conjunctions, articles, and prepositions.

11. The method of claim 1, further comprising the steps of:

searching for a plurality of predetermined keywords within said text;

if one of said plurality of predetermined keywords is found, establishing a sentence containing said one of said plurality of predetermined keywords as a keyword abstract sentence; and producing said abstract based on said first sentence, said one or more abstract sentences, said keyword abstract sentence, and said last sentence.

12. A method of producing an abstract for a text, said text comprising one or more sentences, each sentence comprising one or more words, said method comprising the computer-implemented steps of:

determining the first sentence of said text;

determining the last sentence of said text;

determining, among the remaining sentences of said text, one or more abstract sentences containing numeric information; and counting a number of occurrences for each word within said text;

generating a list of words from said text and the number of occurrences thereof;

pruning said list of words to produce a pruned list of words including the step of removing proper names from said list of words, wherein a proper name has an initial letter that is capitalized when not at the beginning of a sentence of said one or more sentences;

determining a plurality of common words from said pruned list of words, said plurality of common words comprising words from said pruned list of words having at least as many occurrences as any words from said pruned list of words not part of said plurality of common words; and producing said abstract based on said first sentence, said at most ten abstract sentences, said last sentence, and said plurality of common words.

13. A method of searching a plurality of texts, each comprising one or more sentences, said method comprising the computer-implemented steps of:

producing a plurality of abstracts, each abstract based on a corresponding text of said plurality of texts;

receiving a search key from a user;

searching said plurality of abstracts for an abstract that matches said search key; and outputting said abstract that matches said search key;

wherein said abstract contains one or more sentences of the corresponding text, consisting essentially of the first sentence of the corresponding text, at most ten abstract sentences, each containing numeric information, and the last sentence of the corresponding text.

14. A method of searching a plurality of texts, each comprising one or more sentences, said method comprising the computer-implemented steps of:

receiving a search key from a user;

searching said plurality of texts for a text that matches said search key;

producing an abstract, based on a corresponding document of said plurality of texts that matches said search key; and outputting said abstract;

wherein said abstract contains one or more sentences of the corresponding texts, consisting essentially of the first sentence of the corresponding text, at most ten abstract sentences, each containing numeric information, and the last sentence of the corresponding text.

15. A document abstraction system, configured to produce an abstract from a text, comprising one or more sentences each sentence comprising one or more words, said document abstraction system comprising:

means for determining the first sentence of said text;

means for determining the last sentence of said text;

means for determining, among the remaining sentences of said text, at most ten abstract sentences containing numeric information; and means for producing said abstract based on said first sentence, said one or more abstract sentences, and said last sentence.

16. The system of claim 15, wherein said means for determining said one or more abstract sentences containing numeric information includes:

means for searching for said numeric information within said text; and means for establishing a sentence containing said numeric information as an abstract sentence, if said numeric information is found.

17. The system of claim 15, further comprising:

means for determining one or more proper names in said text, wherein a proper name is a word whose initial letter is capitalized when not at the beginning of a sentence of said one or more sentences; and means for producing said abstract based on said one or more proper names.

18. The system of claim 15, further comprising:

means for counting a number of occurrences for each word within said text;

means for generating a list of words from said text and the number of occurrences thereof;

means for pruning said list of words to produce a pruned list of words;

means for determining a plurality of common words from said pruned list of words, said plurality of common words comprising words from said pruned list of words having at least as many occurrences as any words from said pruned list of words not part of said plurality of common words; and means for producing said abstract based on said plurality of common words.

19. The system of claim 15, further comprising:

means for searching for a plurality of predetermined keywords within said text;

means for establishing a sentence containing said one of said plurality of predetermined keywords as a keyword abstract sentence, if one of said plurality of predetermined keywords is found; and means for producing said abstract based on said first sentence, said one or more abstract sentences, said keyword abstract sentence, and said last sentence.

20. A computer-readable medium having stored thereon sequences of instructions for producing an abstract from a document, comprising one or more sentences each comprising one or more words, said sequences of instructions includes sequences of instructions which, when executed by a processor, cause said processor to perform the steps of:

determining the first sentence of said text;

determining the last sentence of said text;

determining, among the remaining sentences of said text, at most ten abstract sentences containing numeric information; and producing said abstract based on said first sentence, said one or more abstract sentences, and said last sentence.

21. The computer-readable medium of claim 20, wherein the step of determining one or more abstract sentences containing numeric information includes the steps of:

searching for said numeric information within said text; and establishing a sentence containing said numeric information as an abstract sentence, if said numeric information is found.

22. The computer-readable medium of claim 20, further comprising sequences of instructions for performing the steps of:

determining one or more proper names in said text, wherein a proper name is a word whose initial letter is capitalized when not at the beginning of a sentence of said one or more sentences; and producing said abstract based on said one or more proper names.

23. The computer-readable medium of claim 20, further comprising sequences of instructions for performing the steps of:

counting a number of occurrences for each word within said text;

generating a list of words from said document and number of occurrences thereof;

pruning said list of words to produce a pruned list of words;

determining a plurality of common words from said pruned list of words, said plurality of common words comprising words from said pruned list of words having at least as many occurrences as any words from said pruned list of words not part of said plurality of common words; and producing said abstract based on said plurality of common words.

24. The computer readable medium of claim 20, further comprising sequences of instructions for performing the steps of:

searching for a plurality of predetermined keywords within said text;

if one of said plurality of predetermined keywords is found, establishing a sentence containing said one of said plurality of predetermined keywords as a keyword abstract sentence; and producing said abstract based on said first sentence, said one or more abstract sentences, said keyword abstract sentence, and said last sentence.

* * * * *